(No Model.) 2 Sheets—Sheet 1.

W. N. MOORE.
STOVE.

No. 308,689. Patented Dec. 2, 1884.

Witnesses
Thos. H. Hutchins.
Wm. J. Hutchins.

Inventor.
William N. Moore.

(No Model.) 2 Sheets—Sheet 2.

W. N. MOORE.
STOVE.

No. 308,689. Patented Dec. 2, 1884.

Witnesses.
Thos. H. Hutchins.
Wm. J. Hutchins.

Inventor.
William N. Moore.

UNITED STATES PATENT OFFICE.

WILLIAM N. MOORE, OF JOLIET, ILLINOIS.

STOVE.

SPECIFICATION forming part of Letters Patent No. 308,689, dated December 2, 1884.

Application filed January 7, 1884. (No model.)

*To all whom it may concern:*

Be it known that I, WILLIAM N. MOORE, a citizen of the United States of America, residing at Joliet, in the county of Will and State of Illinois, have invented certain new and useful Improvements in Stoves, of which the following is a specification, reference being had therein to the accompanying drawings.

Figure 1:
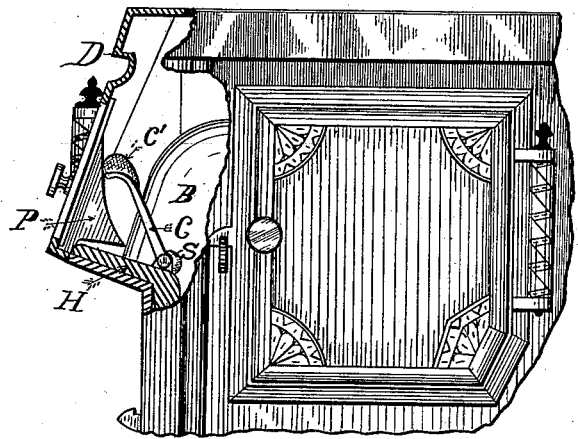
Figure 2:
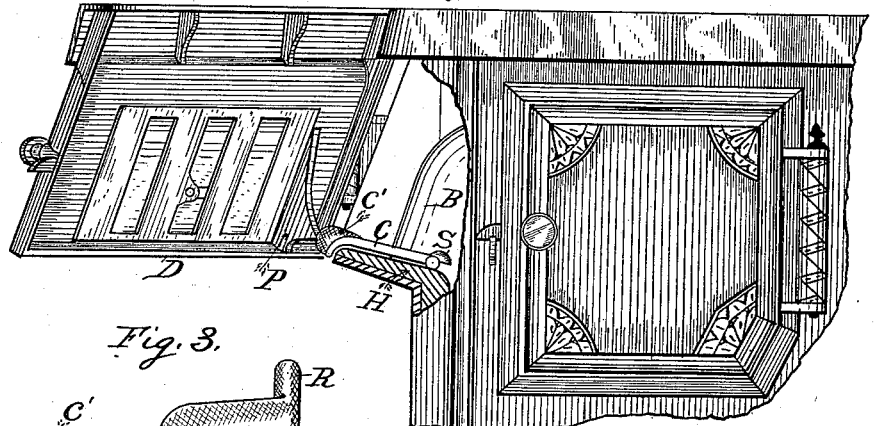
Figure 3:
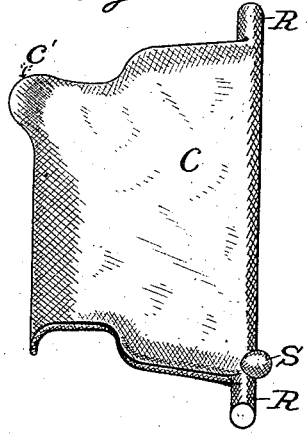
Figure 4:
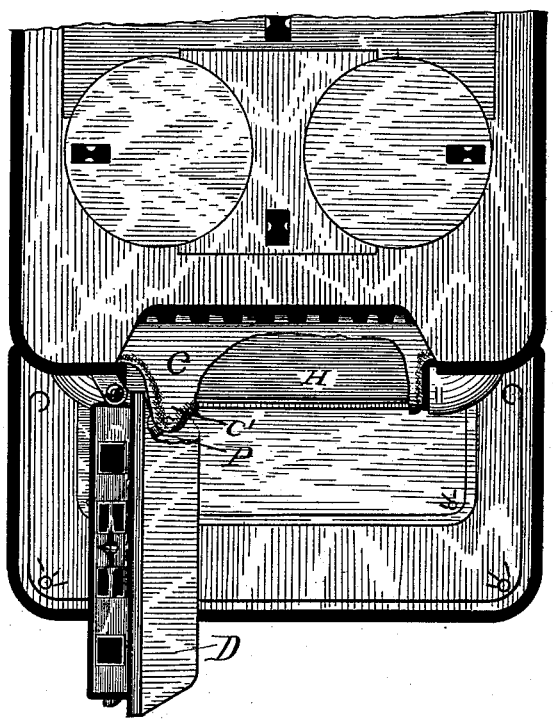

Figure 1 is a side elevation of the front upper part of a stove having a portion broken away, and a section of the feed-door, showing the lug P and apron $c$ in position when the feed-door is closed; Fig. 2, a similar view showing the feed-door partly open and the apron $c$ down, and the manner in which the lug P of the feed-door engages with the lip $c'$ of apron $c$ to elevate or lower said apron; and Fig. 3, a perspective view of the apron $c$ detached from the stove; Fig. 4, a plan view on the top, with a portion of the apron broken away to show the form of the parts protected thereby.

The nature of this invention consists in the use of the apron $c$, which is placed, as shown in Figs. 1 and 2, immediately behind the feed-door D, for the purpose of preventing ashes and coals from falling out on the hearth when the feed-door is opened, and also forming a protection to the upper part of the grate H from the fire.

Referring to the drawings, D represents the upper feed-door of a stove in front, which opens and closes in the ordinary manner. Immediately behind the feed-door D is located the apron $c$. (Shown in perspective in Fig. 3.) This apron has lugs R R at each lower corner, which protrude out through or into the linings B at the ends of the fire-box, forming hinges to permit said apron to oscillate up and down, as shown in Figs. 1 and 2. This apron $c$ is elevated and lowered or oscillated up and down by the opening and closing of the feed-door D. The door D is provided with the inclined lug P, which is so set as to run in under the extending lip $c'$ of the apron $c$. When the feed-door D is closed, the apron $c$ is elevated to stand as shown in Fig. 1, and when the door is open the apron $c$ is let down to lie on the upper part, H, of the grate, as shown in Fig. 2. When the feed-door D closes, as shown in Fig. 1, it elevates the apron $c$, as stated, and thereby throws any ashes or coals that may be on it back into the fire-box, so that when the feed-door is opened again and the apron $c$ let down it will be free of ashes, coals, &c., and thereby prevent them from falling out on the hearth of the stove or on the floor, as is usually the case where no such guard-apron is used, and generally where no such apron is used the fire will warp and spoil the upper part, H, of the grate. As shown in use in Figs. 1 and 2, the apron $c$ forms an absolute protection to the upper part, H, of the grate against the action of the fire in the fire-box. The apron $c$ is not intended to reach up high enough to close the draft through said feed-door, but only high enough to gain the object sought.

I am aware that similar aprons have been used in the front part of a stove and operated by the feed-door to raise and fall for the purpose of guarding the escape of ashes, but not located over the grate to protect it when the apron is down, as in this invention. Such construction I do not claim.

Having thus described my invention, what I claim as new, and desire to secure by Letters Patent, is as follows, to wit:

In a stove, the combination of the feed-door D, having the lug P, grate H, and apron $c$, hinged at the inner edge of the lining, so that when it is down it will overlap and protect the upper part of the grate, substantially as set forth.

WILLIAM N. MOORE.

Witnesses:
THOS. H. HUTCHINS,
M. W. CLAY.